United States Patent [19]
Notaro

[11] 3,991,729
[45] Nov. 16, 1976

[54] METHOD AND APPARATUS FOR INTRODUCING A COMBUSTIBLE MIXTURE INTO THE CYLINDERS OF AN INTERNAL COMBUSTION ENGINE

[75] Inventor: Pietro Notaro, Berlin, Germany

[73] Assignee: H.G.N. Motoren GmbH & Co., Hamburg, Germany

[22] Filed: June 6, 1974

[21] Appl. No.: 476,916

[30] Foreign Application Priority Data
June 14, 1973 Germany............................ 2330249

[52] U.S. Cl............................. 123/75 B; 123/32 ST; 123/26; 123/106; 123/119 D; 123/124 R
[51] Int. Cl.² .................. F02M 23/04; F02B 75/02; F02D 13/00; F02B 41/00
[58] Field of Search ................ 123/75 B, 32 ST, 26, 123/106, 100, 124, 119 D

[56] References Cited
UNITED STATES PATENTS

| | | | |
|---|---|---|---|
| 1,135,082 | 4/1915 | Waite | 123/75 B |
| 1,153,526 | 9/1915 | Sorg | 123/75 B |
| 1,245,519 | 11/1917 | Smith | 123/106 |
| 1,505,697 | 8/1924 | Campbell | 123/75 B |
| 1,712,465 | 5/1929 | Woolson | 123/75 B |
| 2,811,149 | 10/1957 | Tirloni | 123/75 B X |
| 3,040,722 | 6/1962 | Phillips | 123/75 B |

FOREIGN PATENTS OR APPLICATIONS

| | | | |
|---|---|---|---|
| 13,717 | 1915 | United Kingdom | 123/75 B |
| 2,502 | 1906 | United Kingdom | 123/106 |

*Primary Examiner*—Wendell E. Burns
*Attorney, Agent, or Firm*—Cushman, Darby & Cushman

[57] ABSTRACT

Apparatus and a method for the introduction of a combustible mixture into a conventional cylinder of a conventional internal combustion engine. In addition to the conventional camshaft-controlled intake valve, an inlet check valve that is responsive to the pressure within the cylinder is provided. The inlet valve admits combustion air from the surroundings to the cylinder when the piston of the cylinder is in its suction strike, and it is closed off when the piston is in the compression, power, and exhaust strokes. Means can be provided to control the amount of air available to be admitted by the inlet valve in dependence upon the RPM of the engine. Also, a plurality of inlet valves may be provided, as well as a means for sequentially supplying air to them as a function of the engine RPM or only above a certain RPM.

8 Claims, 4 Drawing Figures

METHOD AND APPARATUS FOR INTRODUCING A COMBUSTIBLE MIXTURE INTO THE CYLINDERS OF AN INTERNAL COMBUSTION ENGINE

BACKGROUND AND SUMMARY OF THE INVENTION

The invention relates to a method and an apparatus for the introduction of a combustible mixture from a carburetor or the like, through, at least one intake valve, into the cylinders of an internal combustion engine, in dependence on the position of the piston of the cylinder in question.

In known methods and apparatus, the introduction of the combustible mixture occurs through the camshaft-controlled intake valve, which is opened at the start or prior to the start of the "suction stroke" and which is closed at or after the termination of the suction stroke.

It is a known fact that the amount of mixture admitted into the working volume of the cylinder (called cylinder hereinafter) through the intake valve, due to the motion of the piston, is considerably smaller than the maximum amount which the cylinder could accept. As a result, the full power potential of the cylinder and, thus, of the entire internal combustion engine, is not exploited.

One of several causes for this only partial filling of the cylinder is the shape and method of operation of the intake valve, which is opened and closed by means of the camshaft and whose limited opening times play a large role, especially at high RPM, because the total opening time of the intake valve is relatively short, of the order of magnitude of hundreds of a second. In addition, the usual mushroom shape of the valve tappet represents a flow impedance to the aspirated mixture resulting in deceleration and deviation of the flow. The resulting reduction in the flow velocity necessarily leads to a reduction of the amount of mixture which can be introduced into the cylinder during the opening time.

Almost all known intake valves of this kind have a valve seat angle of 90°. While it is known that the flow crossection is increased by approximately 20% in a valve with a seat angle of 120°, over that with a seat angle of 90°, a valve seat angle of 120° leads to a still greater deceleration of the in-flowing mixture, whereby the advantage of the enlarged flow-crossection is largely offset.

Thus, the mushroom-shaped valve-tappet of presently customary intake valves necessarily represents an obstacle to the flow and opposes a complete filling of the cylinder with combustible mixture.

In order to remove this disadvantage, use has been made of injection pumps which force fuel into the cylinder when the camshaft-controlled intake valve opens, while the combustion air is simultaneously admitted. In this way, the amount of mixture introducible during the opening time of the intake valve is increased. However, such injection pumps are expensive and are usually employed only in large and expensive motor vehicles.

A further possibility for increasing the amount of mixture to be introduced consists of increasing the stroke of the intake valve and/or to prolong its opening time. Thus, for example, the intake valves of internal combustion engines in customary passenger vehicles have a stroke of approximately 4 mm, whereas engines of higher performance have a valve stroke of 6 mm, which is raised to 8 mm in racing cars. In the latter case, there is a simultaneous prolongation of the valve opening time.

While the increase of the valve stroke permits achieving a larger flow crossection for the mixture entering the cylinder, increasing the valve stroke also leads to higher speeds of motion of the valve tappet and, hence, to increased manifestations of wear and higher demands on the valve timing control. Nor is any worthwhile improvement achieved by increasing the flow crossection without increasing the valve stroke, because this increases the mass of the valve tappet to be moved, quite aside from the fact that the limited surface area of the cylinder head generally opposes such an enlargement of the valve crossection. The prolongation of the valve opening times can cause an overlap of the openings of the intake and outlet [exhaust] valves. Among other things, this shifts the maximum torque toward higher RPM and the engine exhibits poor idling.

It has also been attempted to provide several intake valves for each cylinder. But this requires an appropriately shaped and hence considerably more expensive camshaft, so that this solution also is not generally adopted.

For this reason, it has often been attempted to increase the performance of an internal combustion engine by increasing its RPM. This is successful up to a certain limit, even though it increases wear in the engine and changes the overall characteristics of the engine, but when the RPM increases, the amount of mixture which can be introduced into the combustion chamber decreases with increasing engine RPM, partly because of the shorter valve opening times, so that, above a certain RPM, the performance of the engine again declines sharply.

Thus, it is an object of the present invention to create a possibility to increase, in the simplest manner, the quantity of mixture to be introduced into the combustion chamber of the cylinder of an internal combustion engine. This is achieved, according to the invention, in a method of the kind mentioned above, in that, separately from the combustible mixture, combustion air is introduced into the cylinder in direct dependence on the pressure in the cylinder. Thus, in the method according to the invention, at least a part of the combustion air is no longer introduced into a cylinder through a valve controlled by the camshaft, but is introduced into the cylinder under direct control of the pressure; i.e. for example at the beginning of the suction stroke and hence at the onset of reduced pressure in the cylinder, a part of the combustion air is introduced into the cylinder controlled by this onsetting reduced pressure and independently of the camshaft timing.

Due to the fact that the supplementary combustion air does not enter through the usual, camshaft-controlled valve [and therefore the limitations caused thereby are eliminated] there results a substantially greater [generally complete] filling of the cylinder with combustible mixture, and, in this manner, a very large torque is achieved at low RPM.

As already mentioned, the pressure-dependent supply of combustion air can start at the beginning of the suction stroke of the piston and can end at the termination thereof, so that the total time available in principle is utilized for the introduction of combustion air.

Again as already mentioned, the amount of combustible mixture admitted into the cylinder decreases with increasing RPM of the engine. Thus, it is suitable if the proportion of the total mixture represented by the combustion air introduced in dependence on the pressure is increased as a function of engine RPM or is initiated only above a certain RPM and, hence, the decrease of the admitted amount of mixture with increasing RPM is avoided.

For application of the method according to the teachings of the present invention, each cylinder is provided preferably with at least one valve, controllable in dependence on the pressure in the cylinder, which can have the form of a check valve. Thus, in an advantageous embodiment, the inlet valve can include a movable ball and, on the side facing the combustion chamber, a ball support with lateral flow paths; on the side facing away from the combustion chamber, it may include a valve seat for the sphere.

No difficulty is encountered in constructing such inlet valves so as to generate the lowest possible friction losses and to require no lubrication while at the same time achieving very high flow velocities, — leading to high turbulence and thus contributing to the possibility of using a lean mixture and to the complete combustion of the mixture in the combustion chamber. In addition, for a suitable flow direction, cooling of the camshaft-controlled intake valve results, and a reduction of the cylinder temperature. Furthermore, such inlet valves can open and close very abruptly as controlled by the pressure without requiring an especially large valve stroke. Thus, a full supply of combustion air is obtained virtually at the beginning of the opening movement, which is not the case with camshaft-controlled intake valves.

Preferably, the inlet valve is in direct communication with the surrounding air [aspirating combustion air] while the intake valve serves for the supply of a correspondingly "richer" mixture, with the result that a mixture with the desired mixture ratio is produced within the cylinder.

In order to increase the mixture supply as a function of RPM, it is possible to provide several inlet valves per cylinder, which are activated sequentially, for example by actuation of the gas pedal. In this way, the amount of mixture introduced per suction stroke can be very large even at high engine RPM.

It is also possible to permit actuation of the supplementary inlet valve only when a particular gas pedal position — related to the engine RPM — is reached. For this purpose, the gas pedal can be operatively connected by a shaft with the inlet valve. The shaft is disposed transversely within the supply aperture of the inlet valve and rotatable about its longitudinal axis and contains a bore therein which is in a transverse position with respect to the supply aperture of the inlet valve when the latter is in the inactive position so that the shaft closes the supply apertures; whereas the shaft is rotated by suitable control of the gas pedal so that the bore gradually releases the supply aperture of the inlet valve until it finally merges therewith.

BRIEF DESCRIPTION OF THE DRAWINGS

The invention is explained in more detail with the aid of the exemplary embodiments shown in the figures in schematic and simplified form.

DETAILED DESCRIPTION OF THE INVENTION

Figure 1:
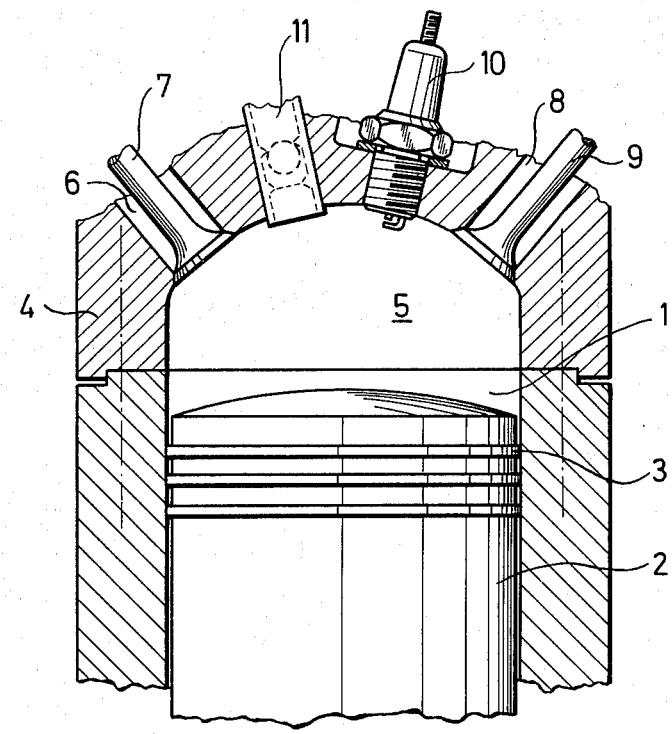
FIG. 1 shows a section of the upper part of the cylinder and piston of an internal combustion engine.

The cylinder 1, shown in simplified manner in FIG. 1, contains a piston 2 with piston rings 3. In customary manner, the piston is connected to the crankshaft (not shown) by a connecting rod (also not shown). Located on cylinder 1 is the cylinder head 4 which is screwed to the cylinder or is connected to it in some other way. This cylinder head 4 contains the intake valve 6, 7 and the exhaust valve 8, 9 as well as a spark plug 10. Usually, the intake valve 6 is connected to a carburetor (not shown) and its valve tappet 7 is controlled by the camshaft (also not shown) just as is the tappet 9 of the exhaust valve. The exhaust valve itself is connected to the exhaust manifold (not shown) which communicates with the exhaust system. The electrical connections for operating the schematically represented spark plug 10 are also not shown. According to the teachings of the present invention, in addition to these usual installations there is provided in the cylinder head an inlet valve 11 which communicates with the surrounding air. This valve 11 is termed an "inlet" valve to distinguish it from the conventional "intake" valve (6, 7), and as is apparent, the two terms are not equivalents in this instance.

Figure 2:
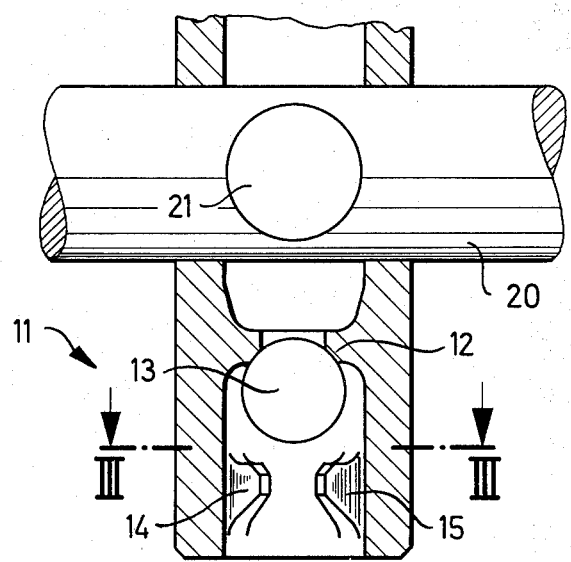
FIG. 2 schematically and in longitudinal section shows an inlet valve according to the invention.
Figure 3:
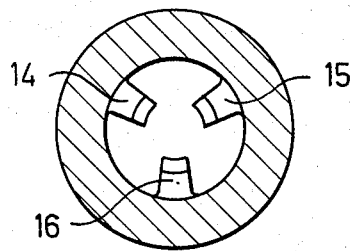
FIG. 3 shows a section along the line III—III in FIG. 2.

As is shown especially in FIGS. 2 and 3, this inlet valve 11 contains a movable sphere 13, which sealingly engages the valve seat 12 during positive gage pressure in the combustion or working chamber 5 or in the cylinder, i.e. during the compression stroke, the power stroke and the exhaust stroke. When the piston begins the suction stroke, the resulting negative gage pressure releases the sphere 13 from the valve seat 12 and the sphere abuts the sphere support 14, 15, 16 containing free lateral flow paths. As an example, this movement of the sphere 13, which opens the entire flow crosssection, is only 2 mm for an inlet valve diameter of 6 mm, so that the inlet valve opens in the shortest possible time [virtually instantaneously], yet without a reduction of the flow crossection in the opened condition. Furthermore, deceleration of the flow by friction losses is avoided because of the spherical form of the member 13. Thus, in supplementation to the intake valve 6, 7, the inlet valve 11 permits a supply of combustion air without high friction losses and with virtually instantaneous onset without making the speed of the motion of the sphere 13 extremely high. Additionally, suitable dimensioning and locating of the inlet valve 11 within the cylinder head can achieve the desired flow velocity and direction, which results not only in the optimal filling of the cylinder with combustible mixture, but also in a particularly favorable comingling due to turbulence and, possibly, cooling of the remaining valves.

The inlet valve shown 11 in FIG. 2 has a shaft 20 which extends transversely to the supply aperture 31 of the valve 11 and which has a central bore 21 in the region of this supply aperture 31 whose diameter substantially corresponds to that of the supply aperture 31. A shaft of this kind is only required if it is desired that the inlet valve 11, which communicates with the surrounding air, is to become effective only at a certain RPM of the engine, or else gradually with increasing RPM. In such a case, prior to the attainment of the RPM at which the inlet valve is to become effective, the shaft 20 is in the position shown in FIG. 2, in which it closes off the supply aperture of the valve completely so that the cylinder receives the mixture consisting of fuel and combustion air only through the intake valve 6. The gas pedal which is related to the engine RPM can so control the shaft 20 that, starting with a predetermined gas pedal position (related to the engine RPM), the bore 21 gradually releases air to the supply aperture of the inlet valve 11, so that supplementary combustion air can reach the cylinder. Simultaneously, the combustible mixture supplied from the carburetor can be set correspondingly "richer" wherein the setting of the desired mixture ratio can be made in the usual manner by means of the carburetor. This leads to a substantially improved filling of the cylinder with combustible mixture. Of course, it is also possible to open the valve gradually, beginning at the lowest engine RPM, until it has attained its fully opened position.

In this way, the break in the torque curve can be shifted toward higher engine RPM's or can be much smoothed so that the performance of the engine is increased by simple means.

Figure 4:
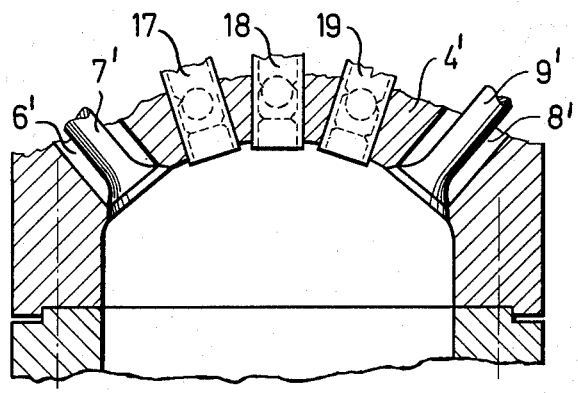
FIG. 4 schematically shows the cylinder head and the upper portion of the cylinder of another exemplary embodiment of the invention.

In order to maintain a maximum value for the amount of mixture per suction stroke, even at high engine RPM, several inlet valves can be provided, as shown schematically in FIG. 4, where, in addition to the intake valve 6', 7' and the exhaust valve 8', 9', the inlet valves 17, 18, 19 are provided within the cylinder head 4' [the spark plug is not shown]. These inlet valves 17, 18, 19 can be opened sequentially with increasing engine RPM, for example, by being coupled mechanically to the gas pedal. At low RPM, only the inlet valve 17 would then be open during the suction stroke, whereas, during further depression of the gas pedal (increasing RPM), the inlet valve 18, and finally the intake valve 19 would additionally be actuated. It should be plain that, in this way, the usual reduction of the amount of mixture admitted to the cylinder at higher RPM can be avoided so that the previous noticable power loss of the internal combustion engines above a certain RPM is eliminated or at least reduced.

In an application of the invention, a four-cylinder engine having a cylinder volume of 298 cm$^3$ was equipped with one inlet valve for each cylinder and the diameter of the exit aperture of the inlet valve was 5.5 mm. In that case, the flow crossection of the usual camshaft-controlled intake valve was approximately 276 mm$^2$, whereas that of the inlet valve according to the invention was only about 24 mm$^2$. In operation, a virtually complete, 100% filling of the cylinder was achieved.

While the invention has been disclosed in what is presently conceived to be the most practical and preferred embodiments, it is apparent that many modifications may be made within the scope of the invention, which scope is not to be limited to details disclosed, but is to be accorded the full scope of the claims so as to embrace all equivalent structures and methods.

What I claim is:

1. Apparatus for the introduction of a combustible mixture into a conventional cylinder of a conventional internal combustion engine, said apparatus comprising
   a. a camshaft-controlled intake valve for admitting a combustion mixture including combustion air from a carburetor or the like into the cylinder, and
   b. means responsive to the pressure within the cylinder for admitting an amount of combustion air at substantially atmospheric pressure into the cylinder in addition to the combustion air in said combustible mixture admitted by said intake valve so that the additional combustion air is introduced during the suction stroke of the piston and the introduction of additional combustion air will generally cease only when the suction stroke is finished so that the cylinder is substantially filled with combustible mixture, said means including at least one inlet valve comprising a spherical valve member, an inlet aperture for allowing entrance of air into the cylinder when not blocked by said valve member, a valve seat for cooperation with said valve member to block said inlet aperture when the pressure in the cylinder is greater than the pressure in said inlet aperture, and means for limiting the movement of said spherical valve member while not interfering with air flow from said inlet aperture to the cylinder when the pressure in the cylinder is less than the pressure in said inlet aperture.

2. Apparatus as recited in claim 1 wherein said means for limiting the movement of said spherical valve member while not interfering with air flow comprises a plurality of spaced projections extending from a wall of said inlet valve, said projections allowing free air flow through the spaces therebetween.

3. Apparatus as recited in claim 1 further comprising means for controlling the amount of air available to said inlet aperture of said inlet valve in dependence upon the RPM of the internal combustion engine with which said apparatus is associated.

4. Apparatus as recited in claim 3 wherein said means for controlling the amount of air available to said inlet aperture comprises a rotatable shaft having a bore therein, said shaft operatively connected to the throttle control of the internal combustion engine.

5. Apparatus as recited in claim 1 wherein said pressure responsive means comprises a plurality of inlet valves.

6. Apparatus for the introduction of a combustible mixture into a conventional cylinder of a conventional internal combustion engine, said apparatus comprising
   a. a camshaft-controlled intake valve for admitting a combustion mixture including combustion air from a carburetor or the like into the cylinder,
   b. means responsive to the pressure within the cylinder for admitting an amount of combustion air at substantially atmospheric pressure into the cylinder in addition to the combustion air in said combustible mixture admitted by said intake valve so that the additional combustion air is introduced during the suction stroke of the piston and the introduction of additional combustion air will generally cease only when the suction stroke is finished so that the cylinder is substantially filled with combustible mixture, and
   c. means for controlling the amount of combustion air admitted into the cylinder by said pressure responsive means in dependence upon the gas pedal position of the internal combustion engine.

7. A method for introducing a combustible mixture into a conventional cylinder of a conventional internal combustion engine having a gas pedal, comprising the steps of
   a. opening a camshaft-controlled intake valve for admitting a combustion mixture including combustion air from a carburetor or the like into the cylinder, b. admitting an amount of combustion air at substantially atmospheric pressure, in addition to the amount of combustion air admitted by said intake valve, into the cylinder, the beginning and the end of the introduction of additional combustion air into the cylinder being dependent upon the difference between the pressure within the cylinder and the pressure of the additional combustion air so that the additional combustion air is introduced during the suction stroke of the piston and the introduction thereof is generally terminated only when the suction stroke is completed so that the cylinder is substantially filled with combustible mixture, and c. adjusting the amount of combustion air available to be admitted to the cylinder by said pressure responsive means in response to the position of the gas pedal of the internal combustion engine.

8. A method for introducing a combustible mixture into a conventional cylinder of a conventional internal combustion engine having a gas pedal, comprising the steps of a. opening a camshaft-controlled intake valve for admitting a combustion mixture including combustion air from a carburetor or the like into the cylinder, b. admitting an amount of combustion air at substantially atmospheric pressure, in addition to the amount of combustion air admitted by said intake valve, into the cylinder, the beginning and the end of the introduction of additional combustion air into the cylinder being dependent upon the difference between the pressure within the cylinder and the pressure of the additional combustion air so that the additional combustion air is introduced during the suction stroke of the piston and the introduction thereof is generally terminated only when the suction stroke is completed so that the cylinder is substantially filled with combustible mixture, and c. providing combustion air available to be admitted to the cylinder by said pressure responsive means only after the gas pedal of the internal combustion engine has reached a predetermined particular position.

* * * * *